United States Patent
Nawa et al.

[11] Patent Number: 5,889,633
[45] Date of Patent: Mar. 30, 1999

[54] CASSETTE TAPE DRIVE HAVING AN IMPROVED MECHANISM FOR OPENING AND CLOSING A TAPE CASSETTE LID

[75] Inventors: Ikuichiro Nawa; Masahiro Harima; Keiichi Setsumasa, all of Atsugi, Japan

[73] Assignee: Mitsumi Electric Co., Ltd., Tokyo, Japan

[21] Appl. No.: 820,687

[22] Filed: Mar. 18, 1997

Related U.S. Application Data

[63] Continuation of Ser. No. 294,266, Aug. 23, 1994, abandoned.

[30] Foreign Application Priority Data

Aug. 26, 1993 [JP] Japan ................................. 5-046515

[51] Int. Cl.⁶ .......................................... G11B 15/675
[52] U.S. Cl. ......................................................... 360/96.5
[58] Field of Search ............................... 360/96.5, 96.6; 242/338, 338.4, 347.1

[56] References Cited

U.S. PATENT DOCUMENTS

| | | | |
|---|---|---|---|
| 4,794,477 | 12/1988 | Hashiguchi et al. | 360/96.5 |
| 5,103,357 | 4/1992 | Nakanishi | 360/96.5 |
| 5,191,494 | 3/1993 | Lee | 360/96.5 |
| 5,214,548 | 5/1993 | Nakanishi | 360/96.6 |

Primary Examiner—William R. Korzuch
Attorney, Agent, or Firm—Frohwitter

[57] ABSTRACT

A cassette lid opening/closing mechanism of a cassette tape driver for a cassette and the like cassettes, which is simply constructed at a reduced price. Holes are formed in the lid opening/closing levers and are pivoted to the support shafts on the side plates of the cassette holder. Hooks at the ends of the lid opening/closing levers are folded inwardly of the cassette holder and then forwardly. The side plates of the cassette holder extend backwardly to enter into the hooks. When the cassette tape is inserted in the cassette holder so that the cassette holder is slid back, the lid opening/closing levers turn and the hooks depress the lid of the cassette tape from the lower side so that the lid is open. The side plates limit the play of the lid opening/closing levers in the right-and-left direction. Therefore, the lid opening/closing levers are pivotally attached without requiring highly precisely machined shafts or bearings.

3 Claims, 5 Drawing Sheets

CASSETTE TAPE DRIVE HAVING AN IMPROVED MECHANISM FOR OPENING AND CLOSING A TAPE CASSETTE LID

This is a continuation of application Ser. No. 08/294,266, filed Aug. 23, 1994, now abandoned.

BACKGROUND OF THE INVENTION

1. Field of the Invention

The present invention relates to a cassette tape drive for DATs and video cassettes. More specifically, the invention relates to a mechanism for opening and closing the lid of tape cassettes.

2. Description of the Prior Art

A conventional cassette tape drive of this type will be described with reference to FIGS. 4 and 5, wherein reference numeral 1 denotes a cassette tape drive. Referring to FIG. 4, the cassette tape drive 1 is so formed that a cassette tape (not shown) is inserted through an opening in the front surface (lower side in the drawing); i.e., the cassette tape is inserted in a cassette holder 2 provided in the opening.

On the side surfaces 3 of the cassette holder 2 are mounted lid opening/closing levers 4, 4. As shown in FIG. 5, bearings 5 are secured at intermediate positions of the lid opening/closing levers 4, 4. Support shafts 6 are provided on the side surfaces 3 of the cassette holder 2 to outwardly protrude in a horizontal direction. The bearings 5 of the lid opening/closing levers 4, 4 are loosely fitted in the support shafts 6, so that the lid opening/closing levers 4 are pivotally supported. The ends of the lid opening/closing levers 4, 4 rearwardly protrude beyond the cassette holder 2, and are folded inwardly of the cassette holder 2 and then forwardly to form hooks 7.

To put the cassette tape into the cassette tape drive 1, the cassette tape is inserted in the cassette holder 2. The cassette holder 2 is then pushed by the cassette tape and moves back. At this moment, pins 8, 8 provided at the other ends (lower side in the drawing) of the lid opening/closing levers 4, 4 are guided sliding along the lower surfaces of cam pieces 10, 10 fastened to the inner surfaces of the frame 9, whereby the above other ends descend, and the hooks 7 at the ends ascend to push both ends of the lid at the front surface of the cassette tape. The lid is then turned upwards and the magnetic recording surface of the cassette tape is exposed.

In order that the lid of the cassette tape is reliably opened and closed, plays of the lid opening/closing lever must be limited in the right-and-left direction, and the hooks at the ends must be brought into reliable engagement with both ends of the lid at the front surface of the cassette tape. In the conventional cassette tape drive, therefore, the bearings fitted to the lid opening/closing levers and the support shafts fitted to the cassette holder have sufficient lengths in order to pivotally support the lid opening/closing levers. Accordingly, the bearings and the support shafts account for an increase in the number of parts, resulting in an increase in the manufacturing cost. It therefore becomes necessary to decrease the number of parts and to suppress the cost of production. The object of the present invention is to solve these problems.

SUMMARY OF THE INVENTION

In order to accomplish the above-mentioned object, the present invention provides a cassette tape drive which uses a tape cassette of which the surface for exposing the tape is covered with a lid that can be opened and closed, wherein levers are pivotally attached to turn up and down on the side surfaces of a cassette holder which is mounted to slide back and forth, the ends of the levers are rearwardly protruded beyond said cassette holder and are folded inwardly of the cassette holder and are then forwardly to form hooks, cam mechanisms are provided to convert the back-and-forth movement of said cassette holder into the rotary movement of the levers, and wherein when the cassette tape is inserted in said cassette holder and is deeply slid, said levers are turned and the lid of the tape cassette is turned by the ends of said hooks, so that the magnetic recording surface of the tape is exposed, the improvement wherein the side plates of said cassette holder are extended to enter into the hooks of said levers to limit the movement of said levers in the right-and-left directions.

The ends of the lid opening/closing levers pivoted to the side plates of the cassette holder are folded inwardly of the cassette holder and then forwardly, so as to hook the lid on the front surface of the cassette tape inserted in the cassette holder, i.e., so as to upwardly turn and open the lid. The side plates of the cassette holder are backwardly extending to enter into the hooks of the lid opening/closing levers to limit the play of the lid opening/closing levers in the right-and-left direction. When the cassette is inserted, therefore, the ends of the lid opening/closing levers are reliably brought into engagement with the lid of the cassette tape and the lid is reliably opened or closed irrespective of the accuracy for supporting the lid opening/closing levers.

BRIEF DESCRIPTION OF THE DRAWINGS

FIGS. 1 to 3 illustrate an embodiment of the present invention, wherein:

FIG. 1 is a partly cut-away plan view of a cassette tape drive and a cassette tape;

FIG. 2 is a plan view illustrating, on an enlarged scale, major portions of the cassette tape drive;

FIG. 3 is a side view of a lid opening/closing lever;

DETAILED DESCRIPTION OF THE PREFERRED EMBODIMENT

Figure 1:
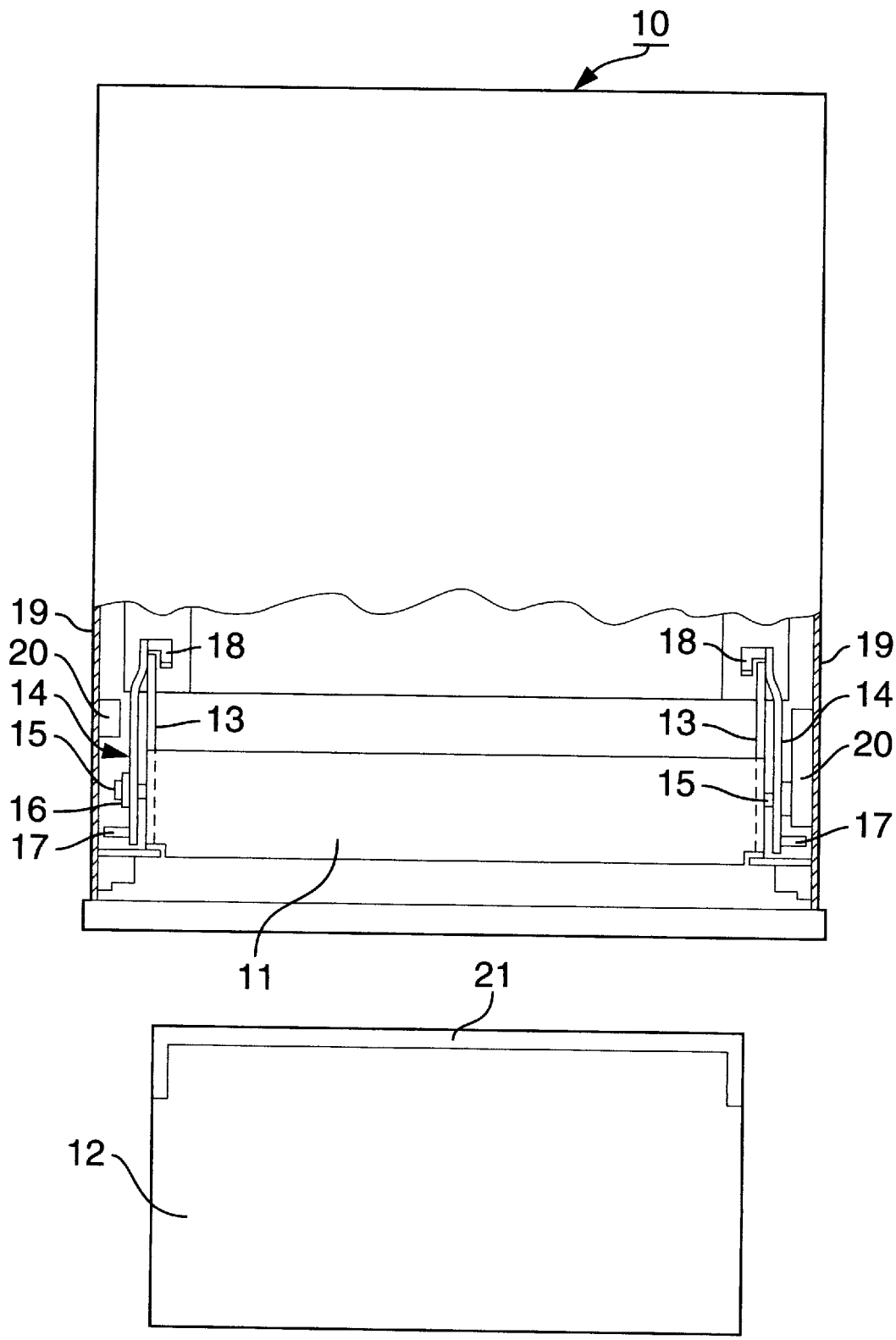

An embodiment of the present invention will now be described in detail with reference to FIGS. 1 to 3. With reference to FIG. 1, a cassette holder 11 is disposed at the inner front part of a cassette tape drive 10. A cassette tape 12 that is inserted from the front surface (lower side in the drawing) is held in the cassette holder 11. Being depressed by the cassette tape 12, the cassette holder 11 moves backwards, so that the cassette tape 12 is set to a predetermined position.

Figure 2:
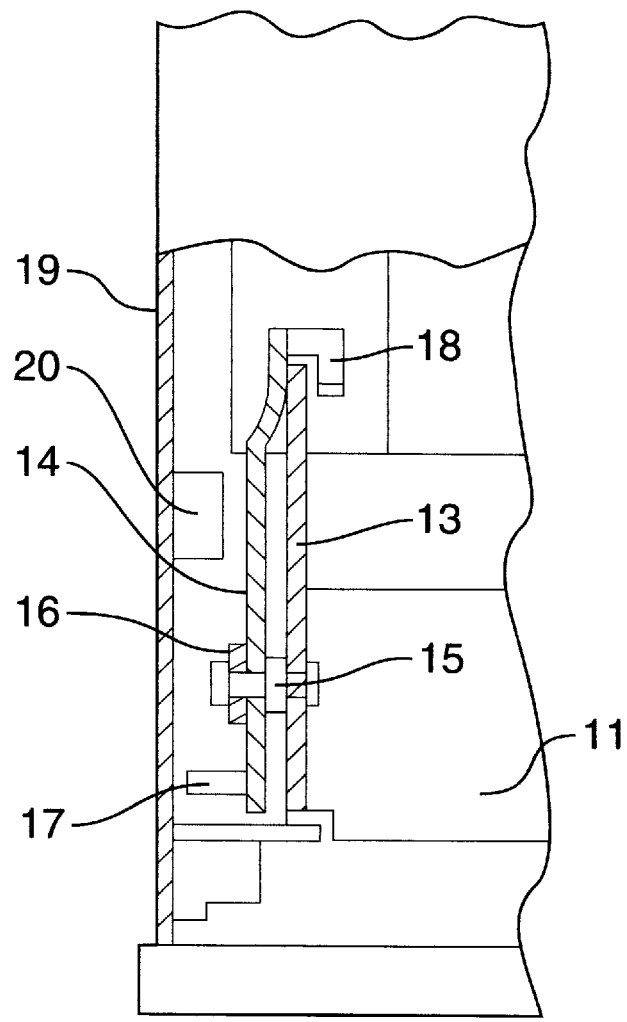

As shown in FIG. 2, the lid opening/closing levers pivoted to the outer sides of the side plates 13, 13 of the cassette holder 11 are loosely fitted at their holes formed at intermediate portions thereof to the support shafts 15, 15 secured to the side plates 13, 13 of the cassette holder 11, and are prevented from escaping by using slit washers 16, 16.

As shown in FIGS. 1 and 2, pins 17, 17 are studded on the outer sides at the rear ends (lower side in the drawings) of the lid opening/closing levers 14, 14, the ends of the lid opening/closing levers 4, 4 rearwardly protrude beyond the cassette holder 11 and are folded inwardly of the cassette holder 11 and then forwardly to form hooks 18. Moreover, the side plates 13, 13 of the cassette holder 11 rearwardly extend to enter into the hooks 18, 18 at the end of the lid opening/closing levers 4, 4.

Figure 3:
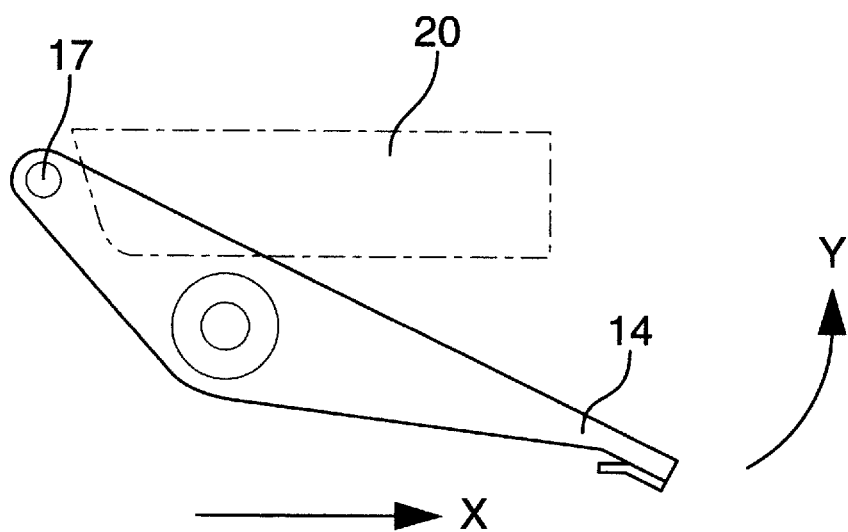
Figure 4:
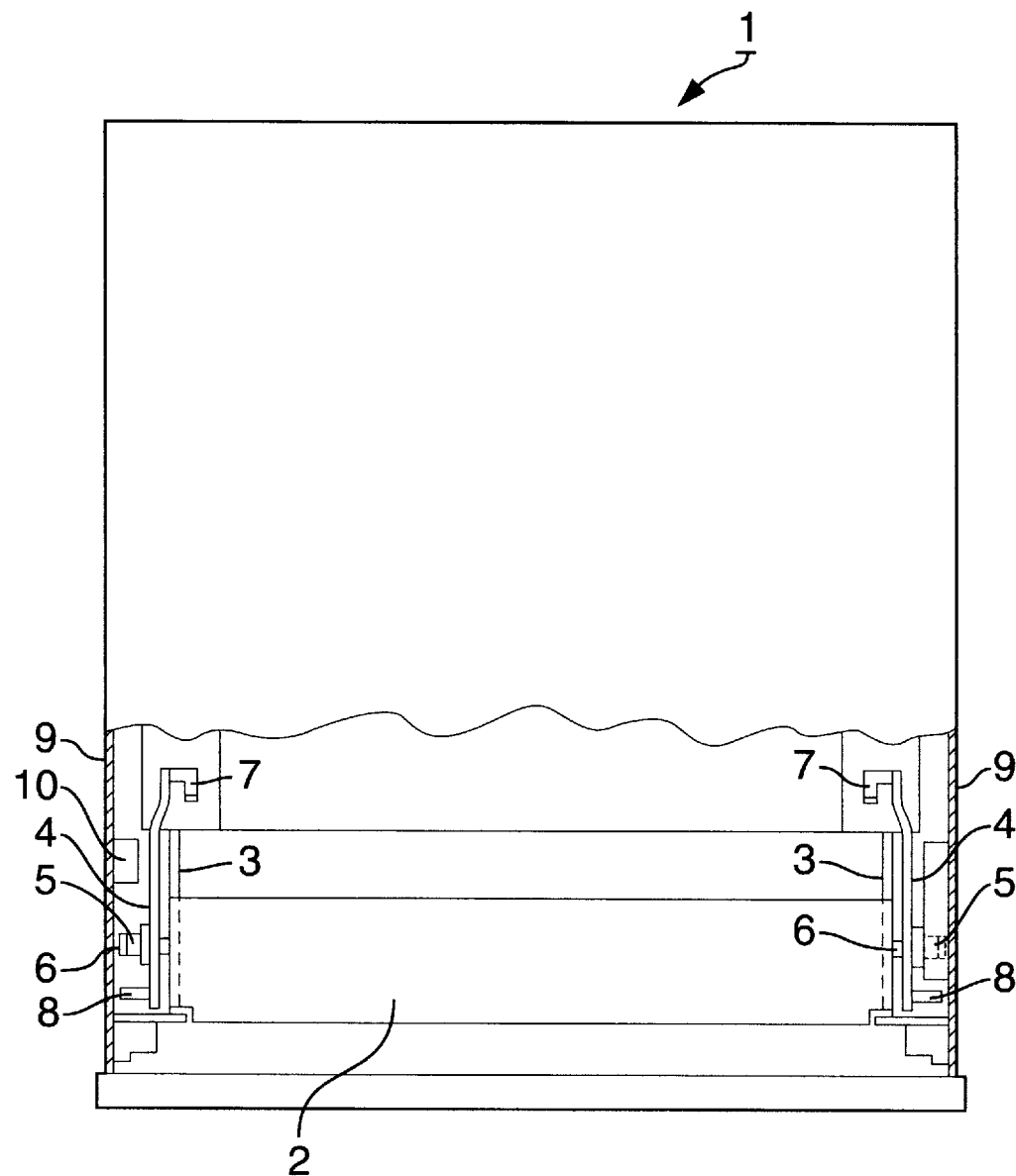
FIG. 4 is a partly cut-away plan view of a conventional cassette tape drive.
Figure 5:
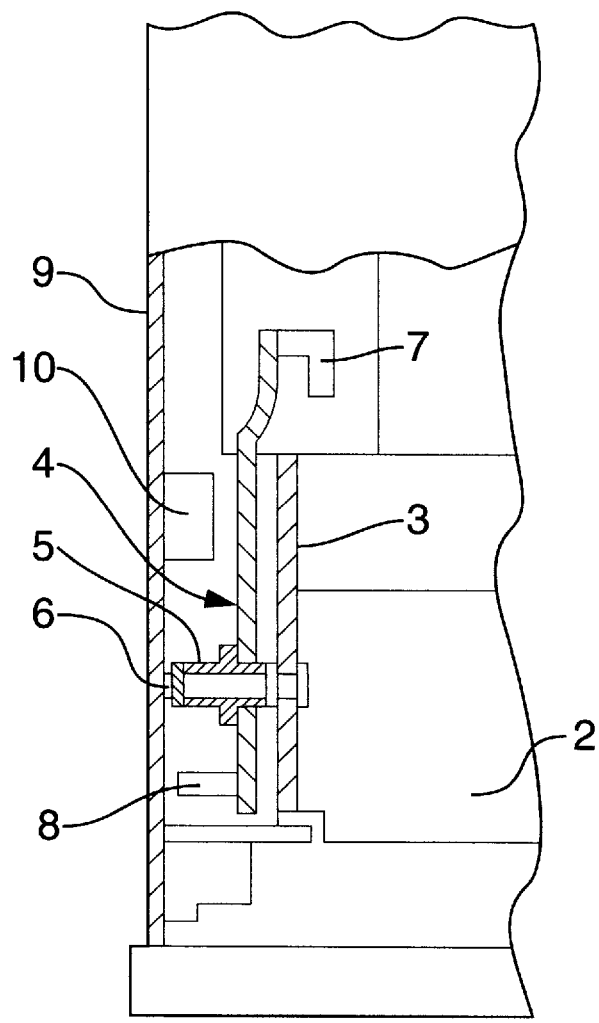
FIG. 5 is a plan view illustrating, on an enlarged scale, the position of a lid opening/closing lever in a conventional cassette tape drive.

When the cassette tape 12 is inserted in the cassette tape drive 10, the cassette holder 11 moves rearwards as shown in FIGS. 1 and 3 (in the direction of arrow X in FIG. 3). At this moment, the pins 17, 17 of the lid opening/closing levers 14, 14 descend being guided by the guides 20, 20 secured to the frame 19, and the hooks 18, 18 at the ends turn upwards (direction of arrow Y).

The hooks 18, 18 ascend while depressing the lower surfaces at both the right and left ends of the lid 21 that is pivotally attached at the front surface of the cassette tape 12. Therefore, the lid 21 of the cassette tape 12 is turned and the magnetic tape is exposed. When the cassette tape 12 is ejected, on the other hand, the cassette holder 11 moves toward the side of the tape insertion port, whereby the lid opening/closing lever 14, 14 return to the initial state being urged by a spring (not shown), the hooks 18, 18 descend, and the lid 21 of the cassette tape 12 is closed.

While the lid opening/closing levers 14, 14 are turning, the rear ends of the side plates 13, 13 of the cassette holder 11 inserted in the hooks 18, 18 of the lid opening/closing levers 14, 14 limit the motion of the lid opening/closing levers 14, 14 in the right-and-left direction. Therefore, the ends of the lid opening/closing levers 14, 14 do not separate away from the lid 21 of the cassette tape 12 while the lid 21 of the cassette tape 12 is opened and closed.

According to the embodiment of the present invention as described above in detail, the side plates of the cassette holder are extended to engage with the hooks at the ends of the lid opening/closing levers thereby to limit the play of the lid opening/closing levers in the right-and-left direction. Unlike the prior art, therefore, highly precisely machined support shafts or bearings are not required, the cassette tape drive is assembled using reduced number of parts and reduced number of steps, enabling the production cost to be decreased. Moreover, large space is not required for accommodating long support shafts and bearings, enabling the device to be realized in a compact size.

Here, it should be noted that the present invention is not limited to the above-mentioned embodiment only but can be modified in a variety of ways without departing from the spirit and scope of the invention.

We claim:

1. A cassette tape drive which uses a tape cassette of which a surface for exposing a tape is covered with a lid that can be opened and closed, wherein levers are pivotally attached to turn up and down on a plurality of side surfaces of a cassette holder which is mounted to slide back and forth, wherein an end of each lever comprises a rearwardly protruding portion which protrudes beyond said cassette holder, an inwardly folding portion which folds inwardly of the cassette holder and a forwardly protruding hook, cam mechanisms are provided to convert the back-and-forth movement of said cassette holder into a rotary movement of the levers, and wherein when the cassette tape is inserted in said cassette holder and is deeply slid, said levers are turned and the lid of the tape cassette is turned by an end of each hook, so that a magnetic recording surface of the tape is exposed, the improvement wherein each side surface of said cassette holder is extended to enter between the rearwardly protruding portion of one of said levers and the forwardly protruding hook of said one of said levers to limit by contact with the rearwardly protruding portion and the forwardly protruding hook the movement of said one of said levers in the right-and-left directions when said one of said levers turns.

2. The cassette tape drive of claim 1, wherein the side surfaces of said cassette holder are extended upwardly and downwardly to enter into the hooks of said levers to limit by contact the movement of said levers in the right and left directions throughout the full range of rotation of said levers.

3. The cassette tape drive of claim 1, wherein the side surfaces of said cassette holder are extended to enter into the hooks of said levers to limit by contact the movement of said levers in the right-and-left directions when said levers are pivoted on a plurality of outer sides of said plurality of side surfaces and are turned to a fully opened position.

* * * * *